United States Patent
Gjerdrum et al.

(10) Patent No.: US 12,111,829 B2
(45) Date of Patent: Oct. 8, 2024

(54) INSTRUCTION LEVEL PARALLELISM IN A DECLARATIVE GRAPH QUERY LANGUAGE

(71) Applicant: Microsoft Technology Licensing, LLC, Redmond, WA (US)

(72) Inventors: Anders Tungeland Gjerdrum, Tromso (NO); Tor Kreutzer, Tromso (NO); Jan-Ove Almli Karlberg, Tromso (NO)

(73) Assignee: Microsoft Technology Licensing, LLC., Redmond, WA (US)

( * ) Notice: Subject to any disclaimer, the term of this patent is extended or adjusted under 35 U.S.C. 154(b) by 0 days.

(21) Appl. No.: 17/822,429

(22) Filed: Aug. 25, 2022

(65) Prior Publication Data

US 2023/0350890 A1    Nov. 2, 2023

Related U.S. Application Data

(60) Provisional application No. 63/336,984, filed on Apr. 29, 2022.

(51) Int. Cl.
*G06F 16/245* (2019.01)
*G06F 16/2453* (2019.01)

(52) U.S. Cl.
CPC .. *G06F 16/24532* (2019.01); *G06F 16/24537* (2019.01); *G06F 16/24545* (2019.01)

(58) Field of Classification Search
None
See application file for complete search history.

(56) References Cited

U.S. PATENT DOCUMENTS

| | | | |
|---|---|---|---|
| 8,126,870 B2 | 2/2012 | Chowdhuri et al. | |
| 8,533,182 B1 | 9/2013 | Charboneau | |
| 9,171,042 B1 | 10/2015 | Welton et al. | |
| 9,235,446 B2* | 1/2016 | Bruno | G06F 16/24 |
| 9,639,575 B2 | 5/2017 | Leida et al. | |
| 10,810,179 B2 | 10/2020 | Risvik et al. | |
| 2011/0258179 A1* | 10/2011 | Weissman | G06F 16/24537 |
| | | | 707/713 |
| 2011/0314019 A1 | 12/2011 | Jimenez et al. | |

(Continued)

OTHER PUBLICATIONS

"Editing the Execution Plan", Retrieved From: https://community.denodo.com/docs/html/browse/6.0/vdp/administration/creating_views/advanced_configuration_of_views/editing_the_execution_plan, Retrieved on: Jun. 2, 2022, 2 Pages.
Besta, et al., "Demystifying Graph Databases: Analysis and Taxonomy of Data Organization, System Designs, and Graph Queries", In Repository of arXiv:1910.09017v5, Sep. 16, 2021, 41 Pages.

(Continued)

*Primary Examiner* — Son T Hoang
(74) *Attorney, Agent, or Firm* — Barta Jones, PLLC

(57) ABSTRACT

Example solutions for executing a query in a declarative graph query language include receiving the query for data in a database and determining if one or both of i) a pattern in the query, and ii) the data in the database render the query suitable for being executed, at least in part, in parallel. If either condition indicates that the query is suitable for being executed, at least in part, in parallel, one or more fork operations and join operations are injected into a query plan, and the query is executed according to the query plan. Some examples further determine whether executing the query in parallel is computing resource-efficient, and only executes computing resource-efficient queries in parallel.

20 Claims, 6 Drawing Sheets

(56) References Cited

U.S. PATENT DOCUMENTS

| | | | | |
|---|---|---|---|---|
| 2012/0310916 | A1* | 12/2012 | Abadi | G06F 16/24542 707/E17.017 |
| 2013/0318068 | A1* | 11/2013 | Apte | G06F 16/24532 707/718 |
| 2014/0136555 | A1 | 5/2014 | Jacob et al. | |
| 2014/0172914 | A1* | 6/2014 | Elnikety | G06F 16/9024 707/774 |
| 2014/0379725 | A1* | 12/2014 | Choe | G06F 16/2228 718/104 |
| 2015/0205880 | A1* | 7/2015 | Perry | G06F 16/24532 707/771 |
| 2016/0291942 | A1* | 10/2016 | Hutchison | G06F 16/24 |
| 2017/0139991 | A1 | 5/2017 | Teletia et al. | |
| 2017/0228425 | A1* | 8/2017 | Kandula | G06F 16/24542 |
| 2017/0316111 | A1 | 11/2017 | Turner et al. | |
| 2018/0150516 | A1* | 5/2018 | Stephan | G06F 16/24532 |
| 2019/0042149 | A1* | 2/2019 | Kesler | G06F 16/9024 |

OTHER PUBLICATIONS

Buck, et al., "Query Processing Architecture Guide", Retrieved From: https://docs.microsoft.com/en-us/sql/relational-databases/query-processing-architecture-guide?view=sql-server-ver16, May 24, 2022, 46 Pages.

Dressler, Sebastian, "PostgreSQL Parallelism can be Like a Box of Chocolates (You Never Know What You're Going to Get)", Retrieved From: https://swarm64.com/post/increase-postgresql-parallelism/, Jun. 8, 2020, 13 Pages.

Hauck, et al., "Scheduling of Graph Queries: Controlling Intra- and Inter-query Parallelism for a High System Throughput", In Repository of arXiv:2110.10797v1, Oct. 20, 2021, 21 Pages.

Morari, et al., "GEMS: Graph Database Engine for Multithreaded Systems", In Publication of Chapman and Hall/CRC, 2015, 6 Pages.

"International Search Report and Written Opinion Issued in PCT Application No. PCT/US23/012858", Mailed Date: Jun. 12, 2023, 9 Pages.

* cited by examiner

INSTRUCTION LEVEL PARALLELISM IN A DECLARATIVE GRAPH QUERY LANGUAGE

CROSS-REFERENCE TO RELATED APPLICATION

This application claims priority to U.S. Provisional Patent Application No. 63/336,984 entitled "INSTRUCTION LEVEL PARALLELISM IN A DECLARATIVE GRAPH QUERY LANGUAGE" filed on Apr. 29, 2022. The above-identified provisional patent application is hereby incorporated by reference in its entirety.

BACKGROUND

Executing queries of data in a database in a linear fashion, when the queries could otherwise be performed in parallel, is often suboptimal and requires more time than if run in parallel. However, not all queries are suitable for executing in parallel. For example, queries on cyclic graphs are less suitable for parallelization than queries on graphs with tree structures. And even when it is possible to execute a query in parallel, the short-term demand on resources may negatively impact other users of a shared resource. Thus, a framework is needed to determine when to execute a query in parallel, in order to speed execution in suitable scenarios.

SUMMARY

The disclosed examples are described in detail below with reference to the accompanying drawing figures listed below. The following summary is provided to illustrate some examples disclosed herein. It is not meant, however, to limit all examples to any particular configuration or sequence of operations.

Example solutions for executing a query in a declarative graph query language comprise: receiving the query for data in a database; determining one or both of i) a pattern in the query, and ii) the data in the database render the query suitable for being executed, at least in part, in parallel; based on at least determining that the query is suitable for being executed, at least in part, in parallel, injecting one or more fork operations and join operations into a query plan; and executing the query according to the query plan.

BRIEF DESCRIPTION OF THE DRAWINGS

The disclosed examples are described in detail below with reference to the accompanying drawing figures listed below.

Corresponding reference characters indicate corresponding parts throughout the drawings. Any of the above figures may be combined into a single example or embodiment.

DETAILED DESCRIPTION

Figure 1:
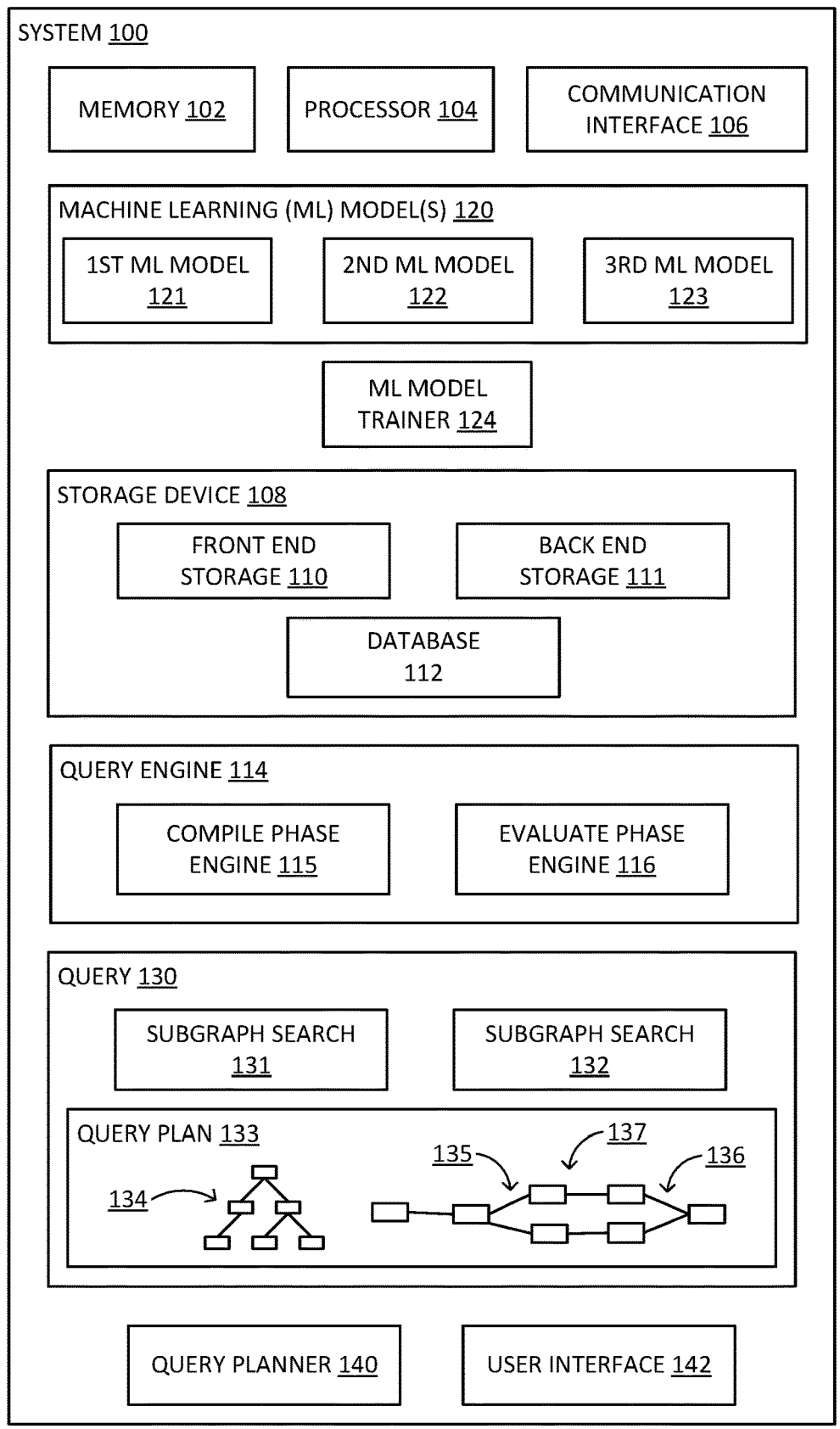
FIG. 1 illustrates an example system that advantageously provides instruction level parallelism in a declarative graph query language.

The various examples will be described in detail with reference to the accompanying drawings. Wherever preferable, the same reference numbers will be used throughout the drawings to refer to the same or like parts. References made throughout this disclosure relating to specific examples and implementations are provided solely for illustrative purposes but, unless indicated to the contrary, are not meant to limit all examples.

Example solutions for executing a query in a declarative graph query language include receiving the query for data in a database and determining whether one or both of i) a pattern in the query, and ii) the data in the database render the query suitable for being executed, at least in part, in parallel. If either condition indicates that the query is suitable for being executed, at least in part, in parallel, one or more fork operations and join operations are injected into a query plan, and the query is executed according to the query plan. Some examples further determine whether executing the query in parallel is computing resource-efficient (e.g., passes a computing resource efficiency threshold), and only executes resource-efficient queries in parallel.

Examples and implementations disclosed herein are directed to systems and methods that detect and exploit parallelism in a declarative graph query language to increase processing performance. In some examples, this parallelism in a graph query is detected using one or both of two classes of optimization techniques: pattern parallelizable and data parallelizable techniques. Examples of the systems and methods presented herein operate in a system including a two-tiered storage model and a two-stage query engine.

Aspects of the disclosure improve power consumption at least by reducing the execution time required to perform a query, for example by injecting one or more fork operations and join operations into a query plan and executing the query according to the query plan. Aspects of the disclosure improve load balancing at least by determining whether executing the query in parallel is resource-efficient and only executing the query in parallel if it is determined to be resource-efficient to do so.

In some examples, data is stored in a graph database and retrieved based on a query for at least part of the data. However, the received query is likely not provided in a form that retrieves the data in an optimal manner, and therefore the query runs sub-optimally. Accordingly, the present disclosure provides systems and methods that identify whether one or more aspects of the query are parallelizable, e.g., performed in parallel, in order to optimize the query. The query is parallelizable, at least in part, based on the data in the graph database being suitable for parallelization or based on patterns in the query being parallelizable. The data in the graph has a known structure prior to the optimization stage of the query plan being executed. Thus, the knowledge of the data structure is used to create a specialized query plan to perform parts of the evaluation in parallel.

In one example, the data structure is a tree-structured graph, such as organizational data stored as a directed graph including no cycles. As referenced herein, a cycle is where, following a set of directed edges, a path through the data structure returns to a node that has been previously visited. For example, an edge exists from node a to node b, an edge exists from node b to node c, an edge exists from node c to node d, and an edge exists from node c to node a. Following this, an edge could exist from node a to node c without encountering any cycles, but following edges out from node c will lead to node d (e.g., node a to node b to node c to node d). However, returning to node a from node c would form a cycle, such as node a to node b to node c.

The directed graph includes one manager having multiple direct reports, and each direct report also having multiple direct reports. A received query is to count the number of direct reports in the levels below the manager in the organization. Because it is known that the data is a directed graph and includes no cycles, the disclosure optimizes counting by splitting up how the tree is traversed. In this example, the data is queried in parallel to count the total number of direct reports as the graph is traversed.

In some examples, the query is also parallelizable, at least in part, based on the structure of the query being suitable for parallelization. For example, a query language of the query expresses a pattern that enables the query to be anchored to a particular node and then query for documents corresponding to the node. For example, where the node represents a person, the query searches for documents the person has authored and emails the person has sent to another person. The documents the person has authored and the emails the person has sent are disjointed and it is visible from the query structure that the two do not depend on each other because files and emails are not the same type of file or file structure. Accordingly, the query in this example is pattern parallelizable by the disclosure to find different entity types, enabling the search for the files to be performed concurrently with the search for the emails.

Even when one or more aspects of the query are capable of being performed in parallel, performing these aspects in parallel may come at a cost in the form of resource cost or overhead cost. For example, the process of updating the received query by injecting parallelism into the query includes forking off of a parallel execution and then joining the forks back together. A fully parallelized query usually returns results more quickly but utilizes more resources due to the additional forking and joining, whereas a received query that is not optimized and executed as received usually takes more time to execute but utilizes fewer resources due to a lack of updating the query. In examples where parallelism is present and could optimize the query, but the degree of parallelism is low, the benefits of parallelizing the query do not outweigh the cost of the resources or parallelization overhead. However, in examples where parallelism is present and could optimize the query to a high degree, the benefits of parallelizing the query are more likely to outweigh the cost of the resources. Accordingly, the present disclosure further provides systems and methods that determine whether executing the query at least partly in parallel is worth the cost (e.g., computational cost). In some examples, the determination is based on one or more of traffic shaping inside the execution environment, load shaping inside the execution environment, runtime parameters of the system as a whole, a rule that is based on the data, a rule that is based on a domain of the data, or based on a model, such as a ML model 120 or a statistical model.

As described herein, the present disclosure provides systems and methods for detecting and exploiting parallelism in a declarative graph query language using one or both of data parallelizable and pattern parallelizable techniques. Structuring relational data through a graph data model enables the modeling of complex concepts which naturally mimic the interdependence of the data. By implementing a specialized query interface, this interdependent information on entities spanning the graph model is inferred. Upon receiving a query plan, the data to be queried and the query are analyzed to determine if parallelism may be added to one or more aspects of the query plan. Where parallelism may be added, the query plan is updated to fork off for parallel execution and then to join the forks together after completion in order to collapse the result.

As referenced herein, declarative graph query languages express the requested graph model through expected patterns, which govern what data is retrieved from the particular graph. In some implementations, these patterns express implicit assumptions on the connectedness of such a spanning graph.

In some examples, the disclosure provides insightful contextualization of a customer's product experience. A core concept in contextualizing a customer is capturing their intent through a graph relational model. Reasoning over such graph models through an efficient graph query language provides relevant and contextualized information back to the customer.

FIG. 1 illustrates an example system for implementing various examples of the present disclosure. The system 100 is provided for illustration only and should not be construed as limiting. Various implementations of the system 100 are possible. For example, additional components may be added, components may be removed, and so forth without departing from the scope of the present disclosure.

The system 100 includes at least one memory 102, at least one processor 104, at least one communication interface 106, a storage device 108, a query engine 114, at least one machine learning (ML) model 120, and a user interface 142. In some implementations, the system 100 is or includes an electronic device. For example, the system 100 is provided as a server, personal computer, laptop, smart phone, server, virtual machine (VM), mobile tablet, hand-held device, consumer electronic, specialty computing device, and/or the like. In other implementations, the system 100 includes a plurality of connected electronic devices.

Figure 6:
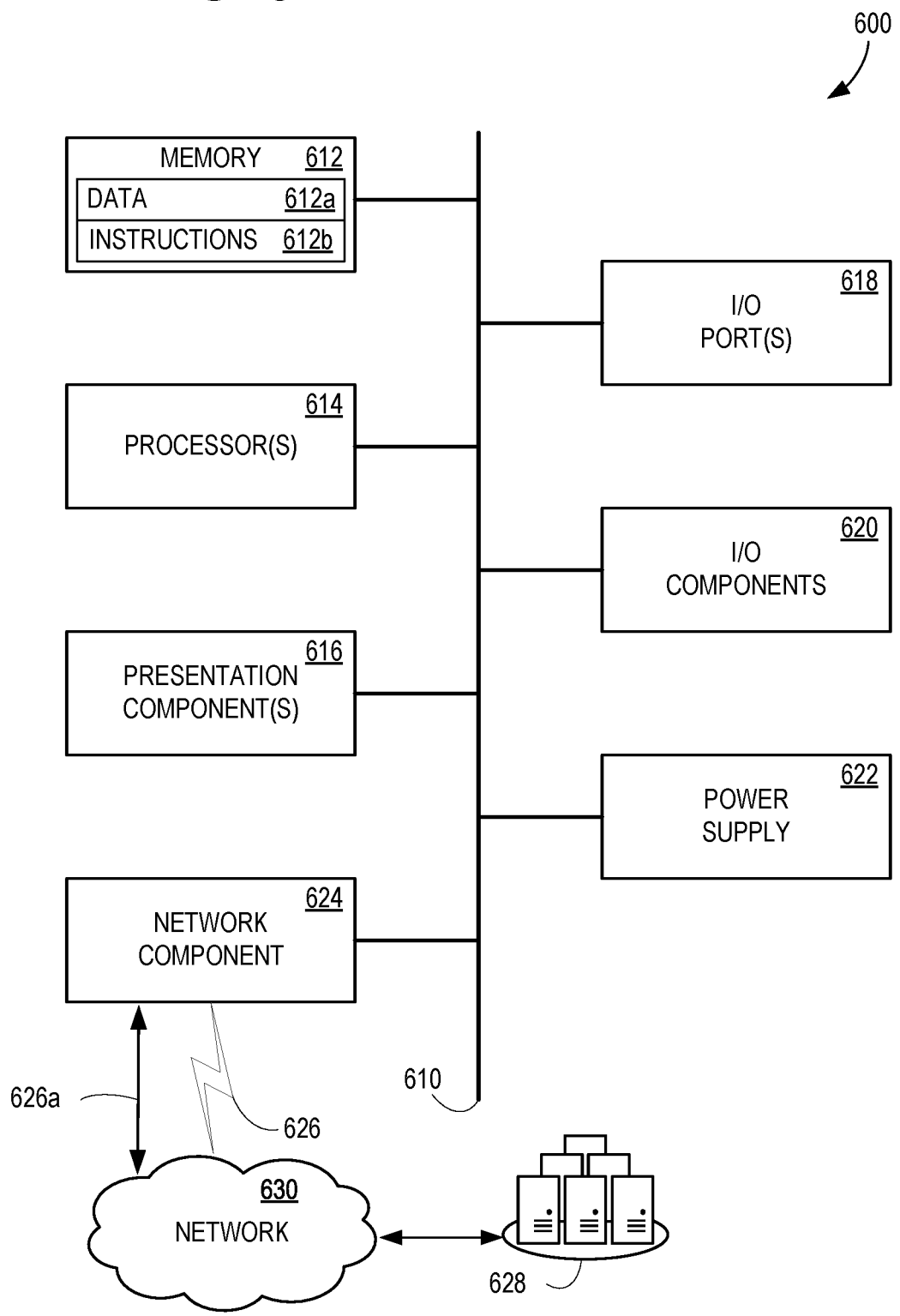
FIG. 6 shows a block diagram of an example computing device suitable for implementing some of the various examples disclosed herein.

The memory 102 is computer-storage memory 612 of FIG. 6, in some examples. The memory 102 stores one or more instructions, application, and data for the system 100. In some implementations, the memory 102 stores instructions that are executed by the processor 104 to execute one or more functions of the operating system of the system 100, applications installed on the system 100, one or more functions of the storage device 108, one or more functions of the query engine 114, and one or more functions of the ML model 120.

The processor 104 executes instructions stored on the memory 102 to execute functions of the storage device 108 and the query engine 114, in particular. The communication interface 106 is configured to transmit and receive signals to communicate with external devices or networks. In some examples, communication between the system 100 and other devices or networks occurs using any protocol or mechanism over any wired or wireless connection as described herein.

The storage device 108 is a two-tiered storage model. For example, the storage device 108 includes a front end storage 110 and a back end storage 111 and hosts database 112 (e.g., a graph database). The front end storage 110 enables the execution of the compile phase engine 115 described in greater detail herein and hosts one or more interfaces and/or application programming interfaces (APIs). In some examples, the front end storage 110 further caches results, for example the results of one or more queries as described herein. The back end storage 111 supports the ability to execute remote procedure calls (RPCs) through the evaluate phase engine 116, described in greater detail herein, and implements one or more data storage facilities. In some examples, the nature of each individual RPC is directly related to the details of the storage model and/or the data layout for a particular query 130 or a particular graph database 112. An example RPC provides instructions for executing the query 130 for the graph database 112 and includes, but is not limited to, instructions to read one or more nodes, read one or more edges, follow one or more edges, execute predicates over one or more nodes and edges, and options to recursively pass on sub-parts of the query 130 for further execution.

In some implementations, the back end storage 111 stores a graph database 112. The graph database 112 includes structured relational data to enable the modeling of complex concepts which naturally mimic the interdependence of the data. This interdependent information on entities spanning the globe is inferred through a query interface in some examples. For example, one or more declarative graph query languages expresses the requested graph model through expected patterns, which govern what data is retrieved from the graph. These patterns express implicit assumptions on the connectedness of such a spanning graph. Accordingly, the present disclosure provides techniques for detecting and exploiting parallelism in a declarative graph query language to increase processing performance. In particular, the present disclosure provides techniques for detecting exploitable parallelism in a graph query.

The query engine 114 executes the query 130 according to the query plan 133, which comprises performing fork and join operations 135 and 136. The query engine 114 is a two-stage query engine that includes a compile phase engine 115 and an evaluate phase engine 116. The compile phase engine 115 is executed on the front end storage 110, while the evaluate phase engine 116 is executed on the back end storage 111. In some implementations, one or more operations of the compile phase engine 115 and the evaluate phase engine 116 are executed concurrently.

As illustrated, the query 130 has a subgraph search 131 and a subgraph search 132, which are queries for distinct non-overlapping subgraphs of database 112. This provides query 130 with a pattern that renders query 130 parallelizable. The query plan 133 has a syntax tree 134 (e.g., an abstract syntax tree). When updated to provide for parallel execution of the query 130, query plan 133 has an operation sequence 137 that includes at least one fork operation 135 and at least one join operation 136.

The ML model 120 is implemented on the processor 104. In some implementations, the ML model 120 includes a plurality of ML models 120, each of which executes a separate ML model 120. For example, the ML models 120 include at least one of a first ML model 122, a second ML model 122, and a third ML model 123. The first ML model 121 executes one or more ML models to determine whether data in a received query 130 for data in a graph database 112 is structured such that, due to the particular data in the graph database 112, the query 130 may be executed, at least in part, in parallel. For example, the first ML model 121 is described in greater detail herein with regards to the method 200. The second ML model 122 executes one or more ML models to determine whether a received query 130 for data in a graph database 112 is structured such that, due to the particular structure of the query 130, may be executed, at least in part, in parallel. For example, the second ML model 122 is described in greater detail herein with regards to the method 300.

The third ML model 123 executes one or more ML models to determine whether, based on the results generated by one or both of the first ML model 121 and the second ML model 122, executing the received query 130 is an efficient use of computing resources. The computing resources include, but are not limited to, processing, storage, and network (e.g., transmission or receipt). Further, executing the received query 130 in this manner results in benefits including but not limited to reduced time to execute the query 130, less computing resources used, reduced financial cost, reduced environmental costs such as carbon dioxide emissions, and so forth. The third ML model 126 is described in greater detail herein with regards to the method 200 and the method 300. The third ML model 126, determining that the query 130 is an efficient use of parallel computing resources and so should be parallelized, is considered as determining that executing the query 130 in parallel passes a computing resource efficiency test.

Other computing resource efficiency tests also exist, such as a statistical model determining whether the query 130 is an efficient use of parallel computing resources. In some examples, determining that executing the query 130 in parallel passes a computing resource efficiency test comprises at least one of: applying a rule based on the data, applying a rule based on a domain of the data, applying an ML model (e.g., ML model 120, third ML model 123), applying load-shaping techniques, and/or applying traffic shaping techniques.

An ML model trainer 124 is used to further train ML model 120, for example by collecting performance information for queries as feedback, so that later queries are better optimized. For example, ML model trainer 124 measures time and expended resources for executing the query 130. Based on at least the measured time and expended resources, the third ML model 123 is trained to better determine whether executing the query 130 in parallel passes a computing resource efficiency test.

Aspects of the disclosure are operable with any computing resource efficiency test. The computing resource efficiency test includes, for example, one or more thresholds (e.g., values) set by a developer, end user, or automatically by a ML component. The threshold(s) correspond to any computing resource, including computational, storage, bandwidth, and the like.

System 100 receives the query 130 for data in database 112 through a user interface 142. The user interface 142 is a display, a monitor, a touch display, and so forth. The user interface 142 is configured to present content, data, and so forth using interfaces from the front end storage 110 and/or cached results stored in the front end storage 110. For example, the user interface 142 presents results of a query of the graph database 112 to a user requesting the query or a user to whom the results of the query are to be transmitted.

In some implementations, one or more components of the system 100 are executed to detect and plan a parallelized query. In order to identify opportunities for pattern or data dependent parallelism, the relationships expressed through the pattern contain relatively few cycles and the underlying RPC mechanism independently requests the relationships. In some examples, the distinct steps are executed concurrently. That is, when system 100 determines one or both of i) a pattern in the query 130, and ii) the data in the database 112 render the query 130 suitable for being executed, at least in part, in parallel, query planner 140 injects one or more fork operations 135 and join operations 136 into the query plan 133 so that query 130 will be executed, at least in part, in parallel.

Figure 2:
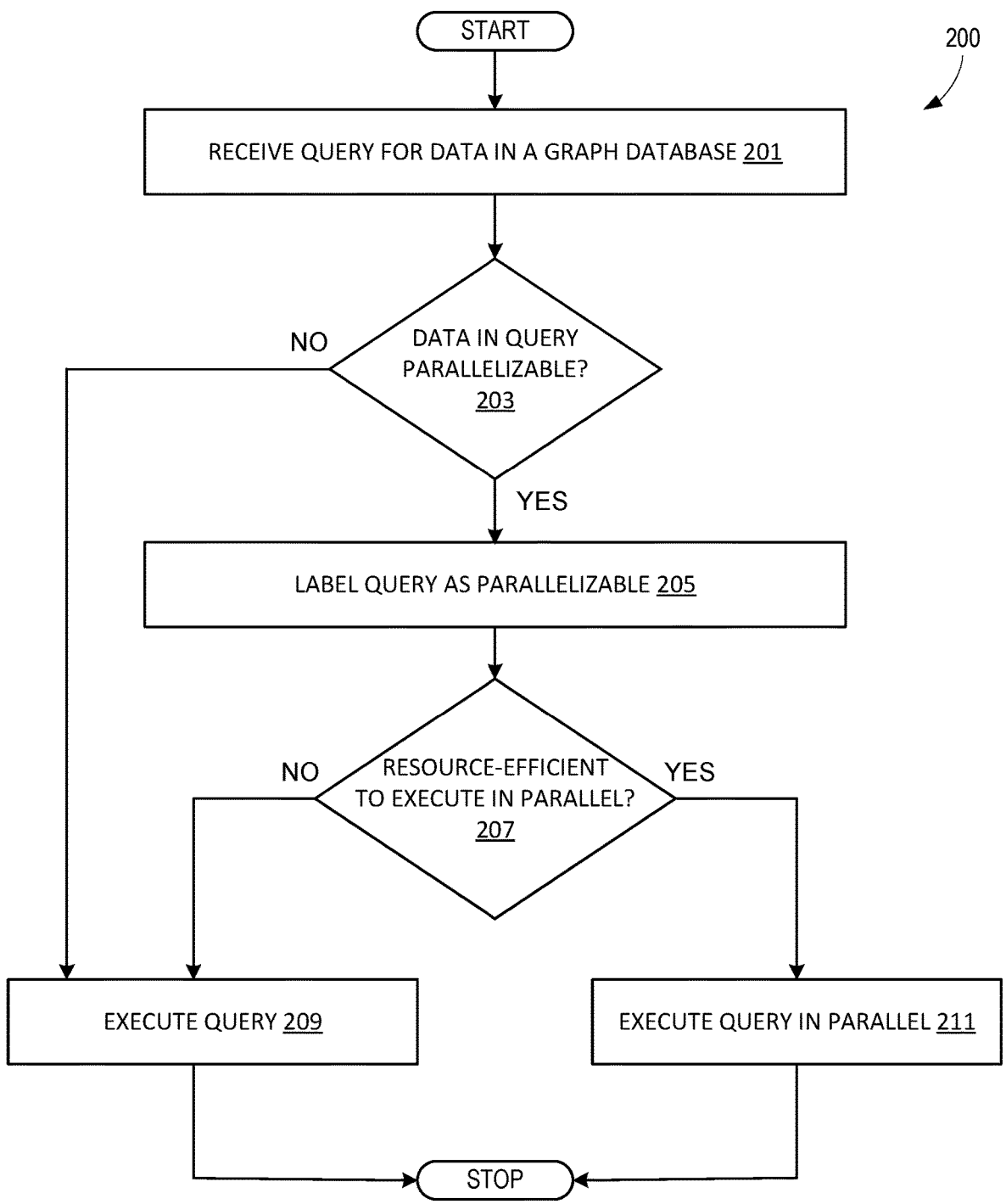
FIG. 2 shows a flowchart of a computer implemented method of a data parallelizable query according to various examples of the present disclosure.

FIG. 2 shows a flowchart of a computer implemented method 200 of a data parallelizable query according to various examples of the present disclosure. The computer implemented method 200 is executed by one or more elements described herein, such as the system 100. In some examples, operations described for method 200 are performed by computing device 600 of FIG. 6. Various implementations of the computer implemented method 200 may be executed without departing from the scope of the present disclosure. One or more steps in the computer implemented method 200 may be added, omitted, or performed in a different order than presented herein.

The computer implemented method 200 begins by the system 100 receiving a query 130 for data in a graph database 112 in operation 201. The query 130 is received via the communications interface 106. In a particular example, the graph database 112 is a graph that models an organization's chain of command. The organization has seven levels of reporting, where each leader has 10 direct reports. The total organizational size is then $10^{11}-1$. The organization is structured as a perfectly balanced tree.

An example query attempts to, for each subordinate of the top entry in the tree, such as a chief executive officer, count the number of people in each direct reports organization. The received query is expressed in one of many forms. For example, the query is expressed through the cypher graph query language expressed as:

MATCH (a)-[:ManagerOf]→(b)
WHERE id(a)=<CEO identifier>
MATCH (b)-[:ManagerOf*1 . . . ]→(employees)
RETURN b.Name, count(employees)

This query will traverse $10^{11}-1$ profile nodes to count the entire organization. In operation 203, the system 100 determines whether the data in the graph database 112 is parallelizable. For example, the data model, e.g., the graph database 112, is analyzed to determine whether the data model supports data parallelization optimization. In some examples, a statistical model is implemented to determine whether the data model supports parallelization. In another example, the first ML model 121 uses schema information containing identifying traits of the edge type to deduce opportunities for parallelism. In some examples, the graph model is guaranteed to contain no cycles and spanning the graph may be parallelized. In such examples, determining that the data in the database 112 renders the query 130 suitable for being executed, at least in part, in parallel comprises determining that the data does not contain a cyclic relationship.

The data is determined to be parallelizable in examples where the data is determined to not contain cyclic relationships. As referenced herein, parallelizable refers to whether the query 130 may be executed in parallel, or otherwise executed such that some portions of the query 130 are executed simultaneously as other portions, due to the data itself or the structure of the data.

In some implementations, operation 203 are executed prior to receiving a query 130. For example, the data model is analyzed periodically, such as at regular intervals or upon modification of the data or the data model, to determine whether the data in the graph database 112 is parallelizable in anticipation of future queries.

Where the data in the query 130 is determined to not be parallelizable, the computer implemented method 200 proceeds to operation 209. Where the data in the query 130 is determined to be parallelizable, the computer implemented method 200 proceeds to operation 205 and labels the query 130 as parallelizable.

In operation 207, the system 100 determines whether executing the query 130 in parallel would be computing resource-efficient. Making the determination that the query 130 in parallel would be computing resource-efficient, or parallel computing resource-efficient, is referred to herein as determining that executing the query 130 in parallel passes a computing resource efficiency test. For example, the system 100 estimates a degree or level (e.g., an absolute number, a percentage, etc.) of benefit for executing the query 130 in parallel, when applicable, and estimate a cost for executing the query 130 in parallel, when applicable, and compare the relative degree of benefit to the cost. In other words, parallelization techniques are selectively applied based on an anticipated benefit. Where the degree of benefit is high enough, the system 100 determines it would be computing resource-efficient to execute the query 130 in parallel. Where the degree of benefit is not high enough, the system 100 determines it would not be computing resource-efficient to execute query 130 in parallel. In some implementations, the determination is made by the third ML model 123. In other implementations, the determination is made by a statistical model.

In examples where the third ML model 123 or statistical model determines executing the query 130 in parallel would not be computing resource-efficient, the computer implemented method 200 proceeds to operation 209 and executes the query 130 in its original, received form. For example, the original parsed query plan 133 is read as follows, from bottom to top:

+Return[ ]
+Aggregate[count(employees) grouped by b.Name]
+Materialize[b.Name, employees]
+VariableExpand[( )_anon[3], b→employees, _anon[3]: Properties: ( ),
employees: Properties: ( )]
+Expand[( )_anon[1], a→b, _anon[1]: Properties: ( ) b: Properties: (Name)]
+NodeById[a, ids:1, Properties: ( )]

In examples where the third ML model 123 or statistical model determines executing the query 130 in parallel would be computing resource-efficient, the computer implemented method 200 proceeds to operation 211 and executes at least part of the query 130 in parallel. Executing the query 130, at least in part, in parallel, includes updating, or reformulating, the query 130 plan by injecting parallelism into the query 130 at the appropriate steps followed by a joining of parallelization executions after the parallelization optimization applies. When the parallelization no longer applies, the parallel efforts are joined and the results are combined, as described in greater detail herein in the description of FIG. 4. For example, the updated parsed query plan 133 is read as follows, from bottom to top:

+Return[ ]
+Aggregate[count(employees) grouped by b.Name]
+Materialize[b.Name, employees]
+Join[b]
+VariableExpand[( )_anon[3], b→employees, _anon[3]: Properties: ( ),
employees: Properties: ( )]
+Fork[b]
+Expand[( )_anon[1], a→b, _anon[1]: Properties: ( ), b: Properties: (Name)]
+NodeById[a, ids:1, Properties: ( )]

The query plan 133 is then serialized and sent to the RPC mechanism for evaluation. In some implementations, the RPC environment spawns concurrent operations for steps in the query plan 133 intersecting the fork and join operations 135 and 136. It should be understood that in order for the concurrent partition to be beneficial, the RPC environment executing the remote procedure is configured to be capable of concurrent data reads.

Figure 3:
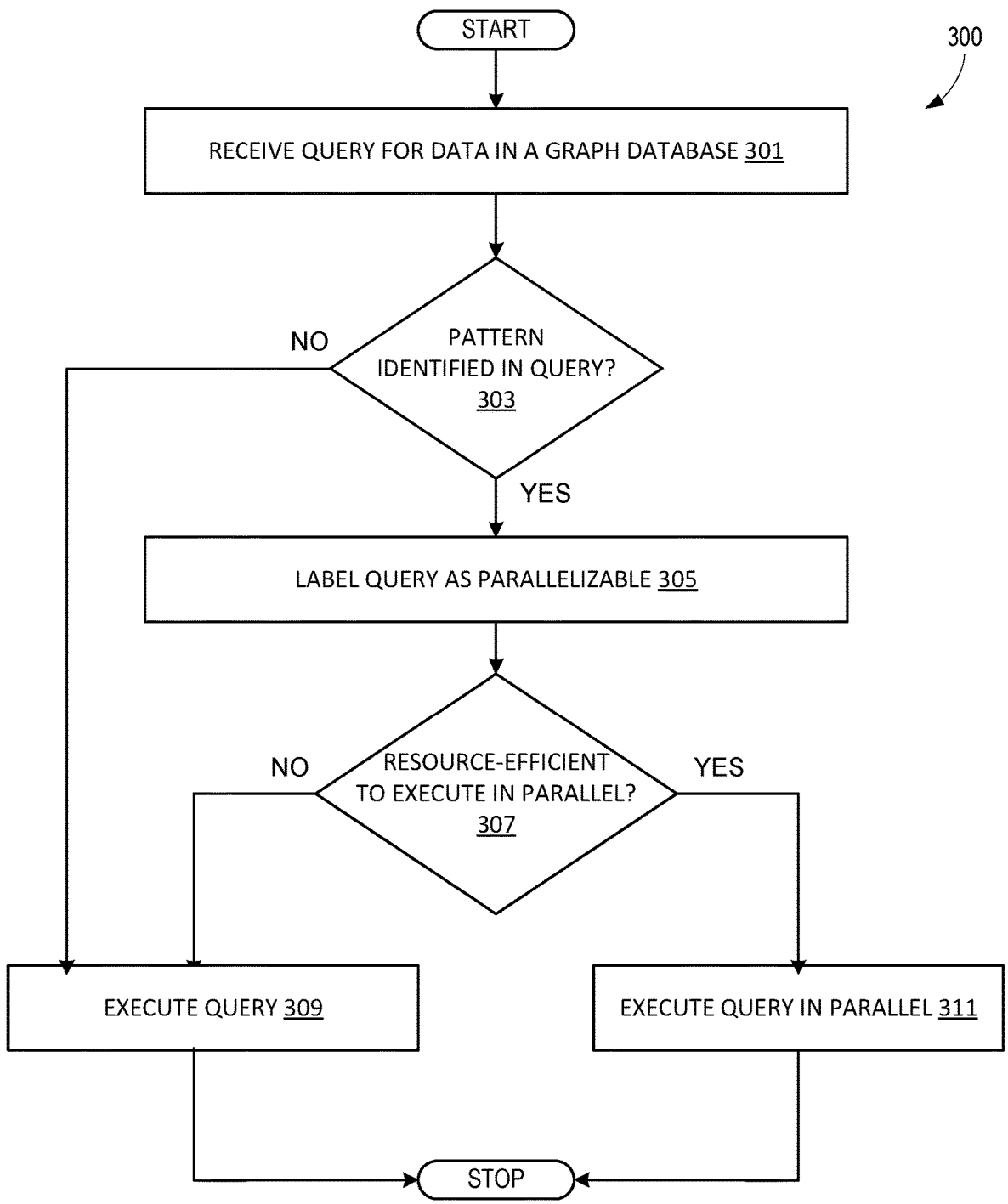
FIG. 3 shows a flowchart of a computer implemented method of a pattern parallelizable query according to various examples of the present disclosure.

In some implementations, the optimized query plan 133 serves as an input to a next potential optimization, which may be pattern optimization as described in greater detail with regards to FIG. 3 herein. In another implementation, where the query 130 is determined to be pattern parallelizable, the optimized query plan 133 created for the pattern parallelizable query 130 serves as an input received in operation 201.

In some examples, following the execution of either the original query plan 133 in operation 209 or the updated query plan 133 in operation 211, data corresponding to the execution of the query 130 is returned to the ML model 120. The data includes measurements of expended resources to modify the query 130, the time spent to modify the query 130, and so forth. The data, or metrics, returned to the ML model 120 are used to further train the ML model 120 on whether the determination to optimize the query plan 133, or not to optimize the query plan 133, in operation 207 was the correct decision. In other words, in some examples, at each step the cardinality of the step is analyzed and returned in order to determine the optimal degree of potential parallelism at each step in order to further improve the ML model 120 for a next received query. In some implementations, the metrics includes the actual entities in the data queried as features to the model so that the query is specialized to each individual node in the graph. For example, where a next query is similar and on the same node in the graph, the ML model 120 will have learned the parallelization is applied effectively or not, depending on the particular metrics.

As referenced herein, a join operation is one which performs two actions. One action includes waiting for a semaphore describing the number of tasks which must complete before continued execution, while the other includes merging the resulting concurrent state into a single view which then execute sequentially. In the example presented herein, the fork and join operations 135 and 136 uses node b as input to determine the level of concurrency possible at each point, and subsequently, how many concurrent operations must conclude in order to continue processing.

FIG. 3 shows a flowchart of a computer implemented method 300 of a pattern parallelizable query according to various examples of the present disclosure. The computer implemented method 300 is executed by one or more elements described herein, such as the system 100. In some examples, operations described for method 300 are performed by computing device 600 of FIG. 6. Various implementations of the computer implemented method 300 may be executed without departing from the scope of the present disclosure. One or more steps in the computer implemented method 300 may be added, omitted, or performed in a different order than presented herein.

The computer implemented method 300 begins by the system 100 receiving a query 130 for data in a graph database 112 in operation 301. The query 130 is received via the communications interface 106. In some implementations, the graph database 112 is a graph that includes more edge and node types in addition to a manager. The graph contains modified actions performed by people in the organization on documents. Additionally, the graph contains information about communications, such as electronic mail, sent between those in the organization.

An example query attempts, for a particular user, to find all documents which a direct report of a particular manager has modified and other users that person sent an email to. The example query is expressed as:
MATCH (manager)-[:ManagerOf]→(direct)
WHERE id(manager)=<CEO identifier>
OPTIONAL MATCH (direct)-[:ModifiedByUser]→(document)
OPTIONAL MATCH (direct)-[:EmailSentTo]→(user)
RETURN direct, document, user In this example, since different edge types and different node types in each pattern statement are being worked on, following the initial traversal to the direct reports, the query pattern interrogates each path independently.

In operation 303, the system 100 determines whether a pattern is identified in the query 130 that is parallelizable. As described herein, parallelizable refers to whether the query 130 may be executed in parallel, e.g., executed such that some portions of the query 130 are executed simultaneously as other portions due to a pattern in the query 130. For example, the second ML model 122 is implemented to determine whether a pattern is present in the query 130 that would make the query 130 parallelizable. In some examples, where the query patterns are for distinct non-overlapping subgraphs, the pattern is determined to be parallelizable. That is, determining that a pattern in the query 130 renders the query 130 suitable for being executed, at least in part, in parallel comprises determining that the query 130 queries two or more distinct non-overlapping subgraphs (e.g., with subgraph searches 131 and 132).

In some examples, a pattern in the query 130 is identified as parallelizable based at least in part on identifying the query 130 adheres to a specific pattern. For example, anchoring a node to find edges to two separate distinct node types is an example of a query pattern. If the query 130 follows this pattern, pattern parallelization is applied and the original query 130 is replaced with the updated query 130 that performs the fork and join operations 135 and 136.

Where the data in the query 130 is determined to not be parallelizable, the computer implemented method 300 proceeds to operation 309. Where the data in the query 130 is determined to be parallelizable, the computer implemented method 300 proceeds to operation 305 and labels the query 130 as parallelizable.

In operation 307, the system 100 determines whether executing the query 130 in parallel would be computing resource-efficient. For example, the system 100 estimates a degree of computing resource benefit for executing the query 130 in parallel, when applicable, and estimate a computing resource cost for executing the query 130 in parallel, when applicable, and compare the relative degree of the computing resource benefit to the computing resource cost. In other words, parallelization techniques are selectively applied based on an anticipated computing resource benefit. Where the degree of benefit is high enough, the system 100 determines it would be computing resource-efficient to execute the query 130 in parallel and where the degree of benefit is not high enough, the system 100 determines it would not be computing resource-efficient to execute the query 130 in parallel. In some implementations, the determination is made by the third ML model 123. In other implementations, the determination is made by a statistical model.

In examples where the third ML model 123 or statistical model determines executing the query 130 in parallel would not be computing resource-efficient, the computer implemented method 300 proceeds to operation 309 and executes the query 130 in its original, received form. For example, the original parsed query plan 133 is read as follows, from bottom to top:

+Return[ ]
+Materialize[direct, document, user]
+OptionalExpand [( )_anon[5], direct→user, anon[5] ]
+OptionalExpand[( )_anon[3], direct→document, anon[3] ]
+Expand[( )_anon[1], manager→direct, anon[1]]
+NodeById[manager, ids:1]

In examples where the third ML model 123 or statistical model determines executing the query 130 in parallel would be computing resource-efficient, the computer implemented method 300 proceeds to operation 311 and executes at least part of the query 130 in parallel. Executing the query 130, at least in part, in parallel, includes updating, or reformulating, the query plan 133 by injecting parallelism (e.g., fork operation 135 and join operation 135) into the query 130 at the appropriate steps followed by a joining of parallelization executions after the parallelization optimization applies. When the parallelization no longer applies, the parallel efforts are joined and the results are combined, injecting parallelism into the query 130, as described in greater detail herein in the description of FIG. 4. For example, the updated parsed query plan 133 is read as follows, from bottom to top:

+Return[ ]
+Materialize[direct,document,user]
+Join[direct]
+Join[direct]
+OptionalExpand [( )_anon[5], direct→user, anon[5]]
+Fork[direct]
+OptionalExpand[( )_anon[3], direct→document, anon[3]]
+Fork[direct]
+Expand[( )_anon[1], manager→direct, anon[1]]
+NodeById[manager, ids:1, Properties: ( )]

In some implementations, the optimized query plan 133 serves as an input to a next potential optimization, which may be data optimization as described in greater detail with regards to FIG. 2 above. In another implementation, where the query 130 is determined to be data parallelizable, the optimized query plan 133 created for the pattern parallelizable query 130 serves as an input received in operation 301.

In some examples, following the execution of either the original query plan 133 in operation 309 or the updated query plan 133 in operation 311, data corresponding to the execution of the query 130 is returned to the ML model 120. The data, or metrics, returned to the ML model 120 are used to further train the ML model 120 on whether the determination to optimize the query plan 133, or not to optimize the query plan 133, in operation 307 was the correct decision. In other words, in some examples, at each step the cardinality of the step is analyzed and returned in order to determine the optimal degree of potential parallelism at each step in order to further improve the ML model 120 for a next received query. In some implementations, the metrics include the actual entities in the data queried as features to the model so that the query is specialized to each individual node in the graph. For example, where a next query is similar and on the same node in the graph, the ML model 120 will have learned the parallelization is applied very effectively or not effectively, depending on the particular metrics.

In some implementations, for pattern parallelizable plans, this strictness is enforced and parallelism is only injected for distinct disjoint traversals across different node/edge types. The algorithm for rewriting the query plan 133 remains the same in this example. However, the detection logic in IsParallelizable inspects the graph schema and graph layout and determines whether the patterns are independent. This check may be relaxed in examples where redundant reads are an acceptable tradeoff for increased parallelism.

It should be understood that although presented herein as separate computer implemented methods 200 and 300, each of the computer implemented methods 200 and 300 are executed upon receipt of a single query, in some examples. In other words, upon receipt of a query 130 for data in a graph database 112, the ML model 120 determines whether the data in the query 130 is parallelizable, as in operation 203, and whether a pattern in the query 130 is parallelizable, as in operation 303. Accordingly, the computer implemented methods 200 and 300 are concurrently executed and if either of the operations 207 and 307 determine that it would be computing resource-efficient to execute in parallel, the query 130 is executed at least in part in parallel in one or both of operations 211 and 311.

In some implementations where the query 130 for the data in the graph database 112 is determined to be both data parallelizable and pattern parallelizable, the determinations whether parallelization is computing resource-efficient are performed together. For example, the system 100 determines parallelization is computing resource-efficient or not computing resource-efficient together. In other implementations, the determinations whether parallelization is computing resource-efficient is performed separately. In this example, the system 100 separately determines whether data parallelization is computing resource-efficient or not computing resource-efficient, and determines whether pattern parallelization is computing resource-efficient or not computing resource-efficient. Where data parallelization is determined to be computing resource-efficient but pattern parallelization is not, the query plan 133 is updated to include data parallelization but not to include pattern parallelization. Similarly, where pattern parallelization is determined to be computing resource-efficient but data parallelization is not, the query plan 133 is updated to include pattern parallelization but not to include data parallelization. Where both data parallelization and pattern parallelization are determined to be computing resource-efficient, the query plan 133 is updated to include both pattern parallelization and data parallelization.

In one example, detecting at least one pattern in the query 130 is parallelizable is enhanced by an understanding of the data to be queried. By mapping the pattern in the query 130 onto the data in the graph database 112, the disjoint node types and edge types are made apparent. In some implementations, a schema is implemented to understand the data, which includes labels, or tags, on each node that describes what the node is. For example, each node is labeled with a recipient of the email and document title for the document to be modified, the schema is leveraged to ensure the data is in fact not the same file or type of file. This enables the structured type of organization to be more effectively implemented.

In some implementations, the schema is used for a data dependent organization. For example, where the schema identifies a particular edge type or relationship type is a one to one relationship or a one to many relationship, the system 100 uses this information to make various assumptions. For example, in the manager chain relationship described herein where a manager has ten direct reports, which is a one to many relationship, it is assumed that there are no zero directs or more than one directs. Based on this knowledge, the system 100 is able to quickly identify, even beforehand, that pattern parallelization is applicable.

In some implementations, the schema is defined based on statistics. For example, where the database 112 is able to record every ingest of a particular edge type or relationship type, it may be determined that for a particular edge type, there has never been a two-way relationship created, the relationship is always one way and always a one to many relationship. In some implementations, the schema is inferred statistically.

In some implementations, the data is analyzed and understood at the time the query 130 is received, rather than before the query 130 is received. For example, if the presence or lack of presence of cycles are recorded, this information is used to estimate the degree to which the query 130 may be parallelized. Even though the estimate is not precise, for example because any present cycles are not recorded, the estimate provides enough information to heuristically decide that parallelization is likely to be worthwhile, in this example. Accordingly, this information is tracked at run time and measured, and then used to further improve one or more aspects of the ML model 120 by providing feedback.

Figure 4:
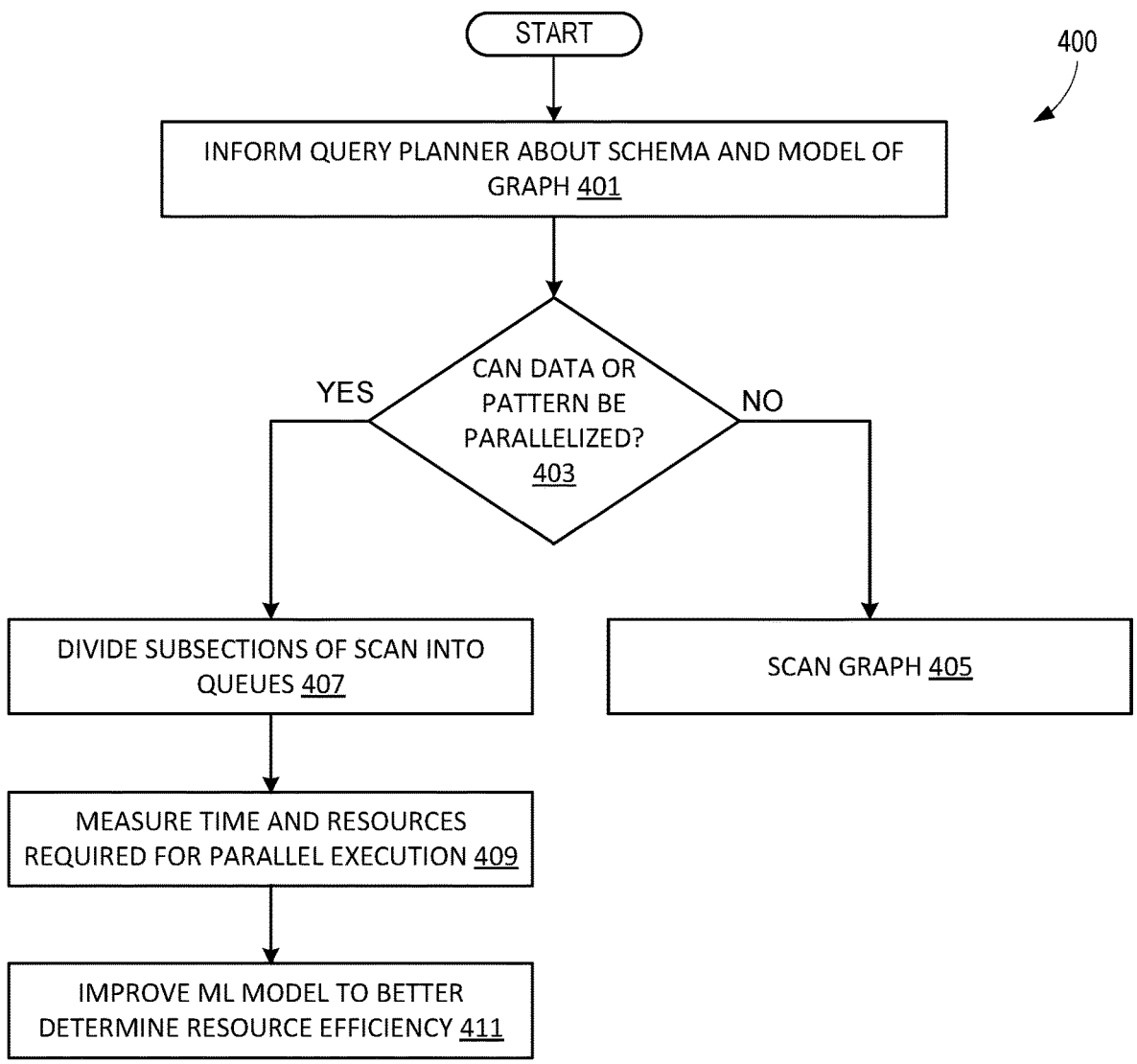
FIG. 4 shows a flowchart of a computer implemented method of injecting parallelism into a query according to various examples of the present disclosure

FIG. 4 shows a flowchart of a computer implemented method 400 of injecting parallelism into a query plan 133 according to various examples of the present disclosure. The computer implemented method 400 may be executed by one or more elements described herein, such as the system 100. In some examples, operations described for method 400 are performed by computing device 600 of FIG. 6. Various implementations of the computer implemented method 400 may be executed without departing from the scope of the present disclosure. One or more steps in the computer implemented method 400 may be added, omitted, or performed in a different order than presented herein.

The computer implemented method 400 begins by informing query planner 140 about the schema and model of the particular graph to be queried in operation 401. In some implementations, the query plan 133 includes an abstract syntax tree 134. Query planner 140 is informed during the compile phase, in some examples.

In operation 403, the system 100 determines whether the data and/or the pattern is parallelizable in the runtime evaluation phase as described herein with regards to the descriptions of FIGS. 2 and 3, respectively. For example, the abstract syntax tree 134 is evaluated left to right and from bottom to top. More particularly, to detect parallelizable patterns, the syntax tree 134 is traversed and instructions declaring the intersecting statements to be concurrent are injected. The instructions are used by the RPC to safely create concurrent execution plans (query plans) for evaluating the intersections in parallel.

In examples where the pattern or data is not determined to be parallelizable, the computer implemented method 400 proceeds to operation 405 and scans the graph without injecting parallelism. In operation 407, based on a determination in operation 403 that the data and/or pattern is parallelizable, subsections of the span are divided into N number of queues, depending on the capable concurrency of the underlying system. The point at which evaluation is divided is dependent on the existing state of the former traversals made in the graph. For example, as described herein, the work is divided depending on nodes found in b. Then, in operation 409, the system 100 scans the graph in parallel as described herein.

One example of a recursive algorithm that injects parallelism is provided as follows:

```
QueryExpression Visit(QueryExpression exp) {
    if (IsParallelizable(exp)) {
        exp.Next = Visit(exp.Next);
        exp = Fork(exp);
        exp.Next.Next = new Join(exp.Next.Next);
    } else {
        exp.Next = Visit(exp.Next);
    }
    return exp;
}
```

In some examples herein, a hierarchical organization is expressed. In these examples, a strict order tree is assumed where each employee has a single manager.

In some examples herein, queries are executed for patterns across different relationship types, connecting distinctly different node types. By graph model and schema for each example respectively, the graph patterns expressed are determined to contain no cycles. For patterns containing cycles, various approaches may be used. In one example, for concurrent tasks, a global set of discovered nodes is updated to indicate that the graph span is complete. This approach requires synchronization across concurrent tasks and reduces the practical parallelism. Where cycles are infrequent, redundant node read operations are merged on join, in some examples. This approach trades unbound parallelism for the probability of cycles being present and redundant read operations for the same nodes as a part of different concurrent operations.

In some examples, the graph in the database 112 is connected in various ways, such as including multiple paths to the same object. For example, a traversal through the graph database 112 is from a first person through people that the first person has worked with to documents that the other people have worked on. There is likely to be overlap between documents that the first person has worked on and the other people have worked on. When analyzing the corresponding node, a determination is made whether or not the person executing this query 130 has access to it. That means that if the query 130 is requesting the documents that are two hops away, the traversal first goes through the coworkers and then to their documents that they have modified and then check access. But, if a determination regarding whether parallelization is possible includes speculatively trying to follow edges from the first person to documents that the first person has modified and checked whether or not the first person has access to that document and stored that in state and arrived at the same note, the system 100 has already determined whether or not the first person had access to the document. This example is similar to a parallel execution of an alternative path to hide latency involved in reading up that node that is more steps away and determining whether or not it is accessible, constructing the result shapes, and so forth.

Accordingly, some examples of determining to update or not update the query plan 133 do not make the determination based on the schema of the data model, but instead based on the previous path from a node to a document the person the node represents has modified, to recognize this as a modified edge. This is the same edge as the node has from outbound from another node, indicating a match. In both instances, the document is being pointed to. In this example, the query 130 is inspected in order to understand the data model and what the data is. In this example, statistical or heuristic based models are implemented because the effect is uncertain. The effect varies even between individual people in the organization in some examples, such as how often those in the organization co-author a document.

In operation 411, ML model trainer 124 measures the time and expended resources for executing the query 130 in parallel. In operation 413, ML model trainer 124 improves ML model 120, specifically third ML model 123, by further training ML model 120 to determine whether executing the query 130 in parallel passes the computing resource efficiency test, based on at least the measurements of operation 411. That is, ML model trainer 124 improves ML model 120 to better determine resource efficiency, based on the performance of the recent query execution.

Figure 5:
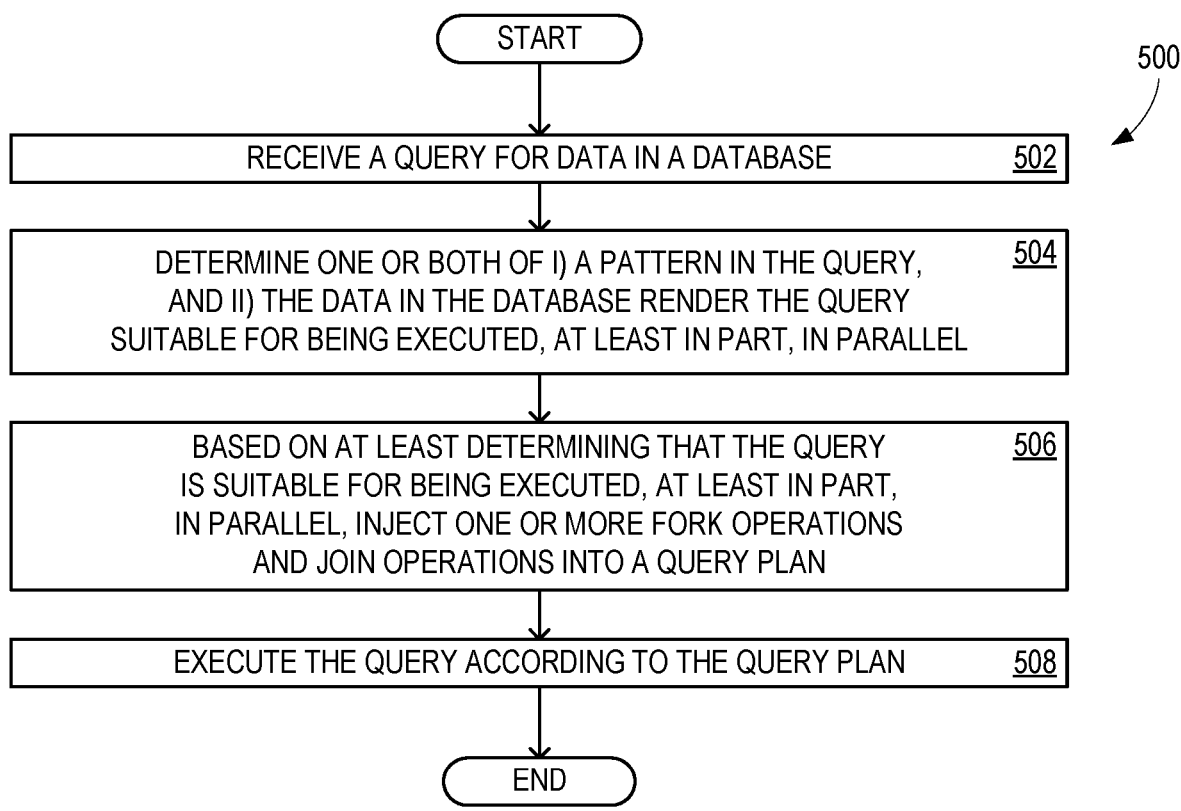
FIG. 5 shows another flowchart illustrating exemplary operations that may occur when using examples such as the system of FIG. 1.

FIG. 5 shows a flowchart 500 illustrating exemplary operations that are performed using examples of system 100. In some examples, operations described for flowchart 500 are performed by computing device 600 of FIG. 6. Flowchart 500 commences with operation 502, which includes receiving the query for data in a database. Operation 504 includes determining one or both of i) a pattern in the query, and ii) the data in the database render the query suitable for being executed, at least in part, in parallel. Operation 506 includes based on at least determining that the query is suitable for being executed, at least in part, in parallel, injecting one or more fork operations and join operations into a query plan. Operation 508 includes executing the query according to the query plan.

Additional Examples

An example system comprises: a processor; and a computer-readable medium storing instructions that are operative upon execution by the processor to: receive the query for data in a database; determine one or both of i) a pattern in the query, and ii) the data in the database render the query suitable for being executed, at least in part, in parallel; based on at least determining that the query is suitable for being executed, at least in part, in parallel, inject one or more fork operations and join operations into a query plan; and execute the query according to the query plan.

An example computerized method comprises: receiving the query for data in a database; determining one or both of i) a pattern in the query, and ii) the data in the database render the query suitable for being executed, at least in part, in parallel; based on at least determining that the query is suitable for being executed, at least in part, in parallel, injecting one or more fork operations and join operations into a query plan; and executing the query according to the query plan.

One or more example computer storage devices have computer-executable instructions stored thereon, which, on execution by a computer, cause the computer to perform operations comprising: receiving a query for data in a database; determining one or both of i) a pattern in the query, and ii) the data in the database render the query suitable for being executed, at least in part, in parallel; based on at least determining that the query is suitable for being executed, at least in part, in parallel, injecting one or more fork operations and join operations into a query plan; and executing the query according to the query plan.

Alternatively, or in addition to the other examples described herein, examples include any combination of the following:

determining that executing the query in parallel passes a computing resource efficiency test;

determining that executing the query in parallel passes the computing resource efficiency test comprises at least one of: applying a rule based on the data, applying a rule based on a domain of the data, applying an ML model, applying load-shaping techniques, and applying traffic shaping techniques;

measuring time and expended resources for executing the query in parallel;

based on at least the measured time and expended resources, training the ML model to determine whether executing the query in parallel passes the computing resource efficiency test;

determining that a pattern in the query renders the query suitable for being executed, at least in part, in parallel comprises determining that the query queries two or more distinct non-overlapping subgraphs;

determining that the data in the database renders the query suitable for being executed, at least in part, in parallel comprises determining that the data does not contain a cyclic relationship;

executing the query comprises performing fork and join operations; and a statistical model determines that the data in the database renders the query suitable for being executed, at least in part, in parallel.

While the aspects of the disclosure have been described in terms of various examples with their associated operations, a person skilled in the art would appreciate that a combination of operations from any number of different examples is also within scope of the aspects of the disclosure.

Example Operating Environment

FIG. 6 is a block diagram of an example computing device 600 for implementing aspects disclosed herein, and is designated generally as computing device 600. In some examples, one or more computing devices 600 are provided for an on-premises computing solution. In some examples, one or more computing devices 600 are provided as a cloud computing solution. In some examples, a combination of on-premises and cloud computing solutions are used. Computing device 600 is but one example of a suitable computing environment and is not intended to suggest any limitation as to the scope of use or functionality of the examples disclosed herein, whether used singly or as part of a larger set.

Neither should computing device 600 be interpreted as having any dependency or requirement relating to any one or combination of components/modules illustrated. The examples disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing devices, etc. The disclosed examples may also be practiced in distributed computing environments when tasks are performed by remote-processing devices that are linked through a communications network.

Computing device 600 includes a bus 610 that directly or indirectly couples the following devices: computer storage memory 612, one or more processors 614, one or more presentation components 616, input/output (I/O) ports 618, I/O components 620, a power supply 622, and a network component 624. While computing device 600 is depicted as a seemingly single device, multiple computing devices 600 may work together and share the depicted device resources. For example, memory 612 may be distributed across multiple devices, and processor(s) 614 may be housed with different devices.

Bus 610 represents what may be one or more busses (such as an address bus, data bus, or a combination thereof). Although the various blocks of FIG. 6 are shown with lines for the sake of clarity, delineating various components may be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 6 and the references herein to a "computing device." Memory 612 may take the form of the computer storage media referenced herein and operatively provide storage of computer-readable instructions, data structures, program modules and other data for the computing device 600. In some examples, memory 612 stores one or more of an operating system, a universal application platform, or other program modules and program data. Memory 612 is thus able to store and access data 612*a* and instructions 612*b* that are executable by processor 614 and configured to carry out the various operations disclosed herein.

In some examples, memory 612 includes computer storage media. Memory 612 may include any quantity of memory associated with or accessible by the computing device 600. Memory 612 may be internal to the computing device 600 (as shown in FIG. 6), external to the computing device 600 (not shown), or both (not shown). Additionally, or alternatively, the memory 612 may be distributed across multiple computing devices 600, for example, in a virtualized environment in which instruction processing is carried out on multiple computing devices 600. For the purposes of this disclosure, "computer storage media," "computer-storage memory," "memory," and "memory devices" are synonymous terms for the computer-storage memory 612, and none of these terms include carrier waves or propagating signaling.

Processor(s) 614 may include any quantity of processing units that read data from various entities, such as memory 612 or I/O components 620. Specifically, processor(s) 614 are programmed to execute computer-executable instructions for implementing aspects of the disclosure. The instructions may be performed by the processor, by multiple processors within the computing device 600, or by a processor external to the client computing device 600. In some examples, the processor(s) 614 are programmed to execute instructions such as those illustrated in the flow charts discussed herein and depicted in the accompanying drawings. Moreover, in some examples, the processor(s) 614 represent an implementation of analog techniques to perform the operations described herein. For example, the operations may be performed by an analog client computing device 600 and/or a digital client computing device 600. Presentation component(s) 616 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 600, across a wired connection, or in other ways. I/O ports 618 allow computing device 600 to be logically coupled to other devices including I/O components 620, some of which may be built in. Example I/O components 620 include, for example but without limitation, a microphone, joystick, game pad, satellite dish, scanner, printer, wireless device, etc.

Computing device 600 may operate in a networked environment via the network component 624 using logical connections to one or more remote computers. In some examples, the network component 624 includes a network interface card and/or computer-executable instructions (e.g., a driver) for operating the network interface card. Communication between the computing device 600 and other devices may occur using any protocol or mechanism over any wired or wireless connection. In some examples, network component 624 is operable to communicate data over public, private, or hybrid (public and private) using a transfer protocol, between devices wirelessly using short range communication technologies (e.g., near-field communication (NFC), Bluetooth™ branded communications, or the like), or a combination thereof. Network component 624 communicates over wireless communication link 626 and/or a wired communication link 626*a* to a remote resource 628 (e.g., a cloud resource) across network 630. Various different examples of communication links 626 and 626*a* include a wireless connection, a wired connection, and/or a dedicated link, and in some examples, at least a portion is routed through the internet.

Although described in connection with an example computing device 600, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein.

Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. In contrast, communication media typically embody computer readable instructions, data structures, program modules, or the like in a modulated data signal such as a carrier wave or other transport mechanism and include any information delivery media.

The order of execution or performance of the operations in examples of the disclosure illustrated and described herein is not essential, and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for executing a query, the system comprising:
   a hardware processor; and
   a computer-readable medium storing instructions that are operative upon execution by the hardware processor to:
   receive the query in a declarative graph query language for data stored in a graph database;
   select data parallelizable optimization based on the data in the graph database or pattern parallelizable optimization based on patterns in the query, wherein the data parallelizable optimization and the pattern parallelizable optimization are different types of parallelizable optimization algorithms;
   determine that executing the query in parallel passes a computing resource efficiency test based on one or more of:
   traffic shaping inside an execution environment of the query, and
   load shaping inside the execution environment of the query;
   inject a fork operation and a join operation into a query plan of the query based on selection of the data parallelizable optimization or the pattern parallelizable optimization, and based on the determination; and
   execute the query according to the query plan.

2. The system of claim 1, wherein the instructions are further operative to:
   select both data parallelizable optimization and pattern parallelizable optimization; and
   inject the fork operation and the join operation into the query plan based on selection of both the data parallelizable optimization and the pattern parallelizable optimization.

3. The system of claim 1, wherein the instructions are further operative to:
   measure time and an expended resource for executing the query in parallel; and
   train a machine learning model to determine whether executing the query in parallel passes the computing resource efficiency test based on at least the measured time and the expended resource.

4. The system of claim 1, wherein the pattern parallelizable optimization is selected based on a determination that the query queries two or more non-overlapping subgraphs.

5. The system of claim 1, wherein the data parallelizable optimization is selected based on a determination that the data does not contain a cyclic relationship.

6. The system of claim 1, wherein a statistical model determines that the data in the graph database renders the query suitable for being executed, at least in part, in parallel.

7. The system of claim 1, wherein the data parallelizable optimization is selected based on the data in the graph database being suitable for parallel execution.

8. The system of claim 1, wherein the pattern parallelizable optimization is selected based on the patterns in the query being suitable for parallel execution.

9. A method for executing a query, the method comprising:
   receiving the query in a declarative graph query language for data stored in a graph database;
   selecting data parallelizable optimization based on the data in the graph database or pattern parallelizable optimization based on patterns in the query, wherein the data parallelizable optimization and the pattern parallelizable optimization are different types of parallelizable optimization algorithms;
   determining that executing the query in parallel passes a computing resource efficiency test based on one or more of:
   traffic shaping inside an execution environment of the query, and load shaping inside the execution environment of the query;

injecting a fork operation and a join operation into a query plan of the query based on selection of the data parallelizable optimization or the pattern parallelizable optimization, and based on the determination; and executing the query according to the query plan.

10. The method of claim 9, further comprising:

selecting both data parallelizable optimization and pattern parallelizable optimization; and injecting the fork operation and the join operation into the query plan based on selection of both the data parallelizable optimization and the pattern parallelizable optimization.

11. The method of claim 9, further comprising:

measuring time and an expended resource for executing the query in parallel; and training a machine learning model to determine whether executing the query in parallel passes the computing resource efficiency test based on at least the measured time and the expended resource.

12. The method of claim 9, wherein the pattern parallelizable optimization is selected based on a determination that the query queries two or more non-overlapping subgraphs.

13. The method of claim 9, wherein the data parallelizable optimization is selected based on a determination that the data does not contain a cyclic relationship.

14. The method of claim 9, wherein the data parallelizable optimization is selected based on the data in the graph database being suitable for parallel execution.

15. The method of claim 9, wherein the pattern parallelizable optimization is selected based on the patterns in the query being suitable for parallel execution.

16. One or more hardware computer storage devices having computer-executable instructions stored thereon, which, on execution by a computer, cause the computer to perform operations comprising:

receiving a query in a declarative graph query language for data stored in a graph database;

selecting data parallelizable optimization based on the data in the graph database or pattern parallelizable optimization based on patterns in the query, wherein the data parallelizable optimization and the pattern parallelizable optimization are different types of parallelizable optimization algorithms;

determining that executing the query in parallel passes a computing resource efficiency test based on one or more of:

traffic shaping inside an execution environment of the query, and load shaping inside the execution environment of the query;

injecting a fork operation and a join operation into a query plan of the query based on selection of the data parallelizable optimization or the pattern parallelizable optimization, and based on the determination; and executing the query according to the query plan.

17. The one or more hardware computer storage devices of claim 16, wherein the operations further comprise:

selecting both data parallelizable optimization and pattern parallelizable optimization; and injecting the fork operation and the join operation into the query plan based on selection of both the data parallelizable optimization and the pattern parallelizable optimization.

18. The one or more hardware computer storage devices of claim 16, wherein the operations further comprise:

measure time and an expended resource for executing the query in parallel; and train a machine learning model to determine whether executing the query in parallel passes the computing resource efficiency test based on at least the measured time and the expended resource.

19. The one or more hardware computer storage devices of claim 16, wherein the pattern parallelizable optimization is selected based on a determination that the query queries two or more non-overlapping subgraphs.

20. The one or more hardware computer storage devices of claim 16, wherein the data parallelizable optimization is selected based on a determination that the data does not contain a cyclic relationship.

* * * * *